2,863,926

MONO-ADDUCTS OF ETHYLENE OXIDE AND ACETYLENIC GLYCOLS

Gilbert B. Carpenter, Mountain Lakes, Morton W. Leeds, Union, and Sidney Gister, Bound Brook, N. J., assignors to Air Reduction Company, Incorporated, New York, N. Y., a corporation of New York No Drawing. Application February 21, 1955
Serial No. 489,796

4 Claims. (Cl. 260—615)

This invention relates to a novel chemical compound and to a process of preparing the same. More particularly, the invention is concerned with the novel mono-adduct of 2,5-dimethyl-3-hexyne-2,5-diol and ethylene oxide, which can be represented by the following formula:

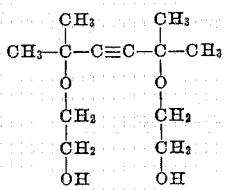

This new compound, 2,5-dimethyl-2,5-di(2'-hydroxyethoxy)-3-hexyne, may be used as a monomer for preparing polyurethane resins such as those described in the copending application of Alio J. Buselli, Serial Number 489,797, filed concurrently herewith, February 21, 1955, now Patent No. 2,809,957, namely "Polyurethane Resins." For example, the reaction of the novel compound and a polyisocyanate selected from the group consisting of aliphatic, aromatic, and cycloalkylene polyisocyanates, produces polyurethane resins which may be used as lacquers, organic coatings, or adhesives. These resins mixed with a suitable solvent, such as ethyl acetate, provide lacquers which have excellent water-resistant properties. The resins are useful as adhesives because of their high tensile strength, desired adhesive properties, and stability. The new compound may also be used as a humectant, a coupling agent, or as an intermediate for the preparation of cosmetics.

The novel compound is conveniently and economically prepared by condensing ethylene oxide with 2,5-dimethyl-3-hexyne-2,5-diol in an inert liquid medium and in the presence of a suitable catalyst, usually a relatively weak base, in accordance with the following equation:

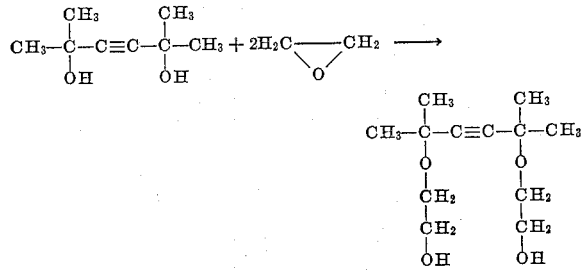

The liquid medium is chemically inert with respect to the reactants, the catalyst, and the products of reaction.

While the following examples will serve to illustrate the invention more fully, they are not to be construed as limiting the scope of the invention.

Example 1

The mixture formed from 35.4 g. dimethylhexynediol and 100 ml. xylene was stirred while 22.0 g. ethylene oxide in liquid form and 2 ml. dimethylaniline were added. The resulting mixture was stirred and heated to a temperature of 75° to 85° C. over a period of five (5) hours. The solvent (xylene) was evaporated, and the residue was distilled. The fraction (13 g.) which distilled at 101–105° C./3 mm. contained the mono-adduct and small amounts of the poly-adduct. The fraction (7 g.) which distilled at 140–150° C./3 mm. contained the poly-adduct principally.

Example 2

The mixture formed from 35.4 g. dimethylhexynediol, 22.0 g. liquid ethylene oxide, 100 ml. xylene, and 2 ml. dimethylaniline was sealed in a pressure container. The mixture was stirred and heated to 80° C. for 10 hours, and then allowed to cool to room temperature. The solvent (xylene) was removed, and the residue was distilled. The fraction (10 g.) which distilled in the range of 95–105° C./1 mm. contained the novel mono-adduct and some unreacted dimethylhexynediol. The fraction (34 g.) which distilled in the range of 125–155° C./2 mm. indicated a poly-adduct formation almost exclusively. In the entire process, about seventy percent (70%) of the dimethylhexynediol had reacted.

In Examples 1 and 2 above, xylene was used as the solvent or liquid reaction medium since it is relatively inert with respect to acetylenic alcohols, catalysts comprising weak bases, ethylene oxide, and products of reaction. In the various experiments using xylene as the solvent, it was noted that the preferred temperature for the formation of the novel mono-adduct ranged from about 75° to 85° C. At lower temperatures, very little or no ethylene oxide adduct was produced; at temperatures significantly above 85° C., the formation of poly-adduct was favored over the desired mono-adduct. While xylene was used as the solvent, in general any inert organic solvent may be preferably used for the reactants, including aromatic hydrocarbons such as benzene, xylene and toluene; dialkyl ethers such as n-butyl ether; and chlorinated aliphatic hydrocarbons such as carbon tetrachloride.

In reactions where organic solvents are employed, the catalysts are relatively weak organic bases, such as aromatic amines. The weak basic strength of aniline and its two derivatives, for example, is shown by the following basic dissociation constants:

Aniline_____ $K_B = 3.5 \times 10^{-10}$
Methylaniline_____ $K_B = 2.6 \times 10^{-10}$
Dimethylaniline_____ $K_B = 2.4 \times 10^{-10}$ The novel compound can be prepared in reactions employing inorganic solvents and relatively weak inorganic bases such as sodium hydroxide solutions. In several examples, ethylene oxide (in gaseous form) was condensed with 2,5-dimethyl-3-hexyne-2,5-diol using sodium hydroxide in solution as the catalyst. After product distillation, a fraction was obtained at 120°–121° C./1 mm., which possessed a refractive index ($n_D^{20°}$) of 1.4637. After it was analyzed, the following results were obtained with respect to its hydrogen and carbon contents:

|         | Theoretical | Found |
|---------|-------------|-------|
| Carbon  | 62.60       | 62.75 |
| Hydrogen| 9.54        | 9.84  |

The above data definitely established the identity of the novel compound, 2,5 - dimethyl - 2,5 - di(2'-hydroxyethoxy)-3-hexyne.

While the above equation indicates a molar ratio of 2:1 for the ethylene oxide and dimethylhexynediol, respectively, usually an excess of the alcohol is provided to obtain greater yields of the novel mono-adduct. The mono-adduct is formed under dilute conditions, otherwise the reaction is difficult to control. The product removed from the solution will probably contain small amounts of poly-adduct and unreacted material, which can be removed, if necessary, by recrystallization procedures well known in the art.

One advantage of the present invention lies in obtaining a reactive product from an alcohol which is comparatively inert or sluggish in various reactions. It is well known in the art that alcohols containing one or more tertiary hydroxyl groups are less reactive generally than alcohols containing primary or secondary hydroxyl groups. In the present invention, the acetylenic glycol (2,5-dimethyl-3-hexyne-2,5 diol) containing two tertiary hydroxyl groups is condensed with ethylene oxide to produce the monoadduct, 2,5-dimethyl-2,5-di(2'-hydroxyethoxy)-3-hexyne, containing two primary hydroxyl groups. Hence the novel compound is more reactive than its precursor, dimethylhexynediol, especially in reactions involving the replacement or substitution of the hydrogen atom in the hydroxyl group.

We claim:

1. 2,5-dimethyl-2,5-di(2'-hydroxyethoxy)-3-hexyne.

2. A process of preparing 2,5-dimethyl-2,5-di(2'-hydroxyethoxy)-3-hexyne, which comprises reacting ethylene oxide and 2,5-dimethyl-3-hexyne-2,5-diol in a liquid medium inert with respect to said reactants and products of reaction and in the presence of a suitable catalyst comprising a weak base.

3. A process of preparing 2,5-dimethyl-2,5-di(2'-hydroxyethoxy)-3-hexyne, which comprises reacting ethylene oxide and 2,5-dimethyl-3-hexyne-2,5-diol in an inert organic liquid medium and in the presence of a catalyst comprising a weak organic base.

4. A process in accordance with claim 3 in which the reaction is conducted in liquid xylene and in the presence of dimethylaniline as a catalyst, and conducting said reaction at a temperature of about 75° C. to 85° C.

References Cited in the file of this patent

UNITED STATES PATENTS 2,053,708     Fife _____ Sept. 8, 1936

OTHER REFERENCES

Johnson: "Acetylenic Compounds," vol. 1, pp. 40, 274, 280 and 283 (1946).

Royals: Advanced Organic Chemistry (1956), pp. 51, 232, 266 and 284.